United States Patent [19]

Asada

[11] Patent Number: 5,728,355
[45] Date of Patent: Mar. 17, 1998

[54] METHOD FOR RECOVERING REUSABLE RARE EARTH COMPOUNDS

[75] Inventor: Akira Asada, Hyogo-ken, Japan

[73] Assignee: Santoku Metal Industry Co., Ltd., Kobe, Japan

[21] Appl. No.: 710,843

[22] Filed: Sep. 23, 1996

[30] Foreign Application Priority Data

Sep. 27, 1995 [JP] Japan ................... 7-249141

[51] Int. Cl.⁶ ................... C01F 17/00
[52] U.S. Cl. ................... 423/21.1
[58] Field of Search ................... 423/21.1, 263; 205/368; 75/610

[56] References Cited

U.S. PATENT DOCUMENTS

| | | | |
|---|---|---|---|
| 3,341,437 | 9/1967 | Wood | 423/21.1 |
| 4,760,966 | 8/1988 | Finnegan et al. | 241/18 |
| 5,110,374 | 5/1992 | Takeshita et al. | 241/18 |
| 5,143,560 | 9/1992 | Doser | 241/18 |

FOREIGN PATENT DOCUMENTS

| | | | |
|---|---|---|---|
| 467180 | 1/1992 | European Pat. Off. | 423/21.1 |
| 59-89734 | 5/1984 | Japan | 423/21.1 |
| 62-187112 | 8/1987 | Japan | 423/21.1 |
| 2-22425 | 1/1990 | Japan | 423/21.1 |
| 5-14777 | 1/1993 | Japan | 423/21.1 |

*Primary Examiner*—Steven Bos
*Attorney, Agent, or Firm*—Keil & Weinkauf

[57] ABSTRACT

A method for recovering reusable rare earth compounds such as rare earth oxides, rare earth fluorides, or rare earth metals from rare earth alloy scrap in an effective and safe manner. The method includes the steps of: (a) pulverizing rare earth alloy scrap at least by hydrogenating the alloy scrap to obtain pulverized alloy scrap, (b) heating the pulverized alloy scrap to obtain an oxide, (c) contacting the oxide with an acid solution to leach rare earth element into the acid solution in the form of ions, and filtering a resulting solution containing rare earth ions to obtain a filtrate, and (d) forming a precipitate containing rare earth element from the filtrate.

13 Claims, 1 Drawing Sheet

METHOD FOR RECOVERING REUSABLE RARE EARTH COMPOUNDS

BACKGROUND OF THE INVENTION

This invention relates to a method for recovering reusable rare earth compounds such as rare earth oxides, rare earth fluorides, and rare earth metals from rare earth alloy scrap.

In the recent years, various alloys containing rare earth metals have been developed for various usage. For example, rare earth metal-iron alloys containing about 30 weight % of rare earth metals, about 65 weight % of iron, 2 weight % of boron, and other components are used for high performance permanent magnets. In producing such permanent magnets, alloy scrap including alloy wastes, defective products, and slug which amount about 10 to 30 weight % of the ultimate products are generated. This alloy scrap contains about 30 weight % of rare earth metals.

Alternatively, for example, rare earth metal-nickel alloys containing about 30 weight % of rare earth metals, about 65 weight % of nickel, 3.5 weight % of cobalt, and other components are used for anodes for nickel-hydrogen rechargeable batteries. In producing such anodes for rechargeable batteries, alloy scrap which amount about 3 to 10 weight % of the ultimate products are also generated. In this alloy scrap, about 30 weight % of rare earth metals are contained.

The rare earth metals contained in the alloy scrap are rare resources, so that they are expensive and valuable. However, with the conventional method, even if the alloy scrap generally in the form of agglomerate could be pulverized irrespective of risk of ignition, the pulverized alloy scrap is highly oxidized, and cannot be subjected to reuse without further treatment as magnet alloy powders or hydrogen alloy powders, since it does not exhibit desired properties. Accordingly, recovery of rare earth metals has been recognized to be difficult in view of quality, economy, and safety, and effective methods for recovery have not been discussed. Thus, the alloy scrap has been disposed as industrial wastes after it is processed into a safe form.

In order to separate rare earth elements from rare earth alloys, a strong acid dissolving method is conventionally known. According to the strong acid dissolving method, rare earth oxides are produced by dissolving rare earth alloy completely in a strong acid such as chloric acid, nitric acid, or sulfuric acid in its entirety; adjusting pH of the resulting solution by adding alkali such as sodium hydroxide, potassium hydroxide, or ammonium hydroxide to precipitate iron, nickel, cobalt, and the like contained in the solution; filtering out the precipitate; adding oxalic acid, ammonium bicarbonate, or sodium carbonate to the filtrate to precipitate rare earth elements contained in the filtrate; separating the precipitate by filteration; and drying and calcining the separated precipitate to give rare earth oxides. Therefore, recovery of rare earth elements from agglomerate alloy scrap seems to be possible according to this method.

However, in the above strong acid dissolving method, since the rare earth alloy is completely dissolved in a strong acid, an extremely large amount of acid is required, as well as extremely large amount of alkali for precipitating iron, nickel, cobalt, and the like for separation thereof afterwards. If this method is applied to alloy scrap, cost for recovery becomes exceedingly high, and special facilities for post-treatment of the separated hydroxides of iron and nickel are also needed. Thus, it is economically more advantageous to dispose of the alloy scrap.

Japanese Patent Publication No. 5-14777 discloses another method for separating rare earth elements, which method includes the steps of: air-oxidizing powdered rare earth metal-iron alloy to convert the components such as iron to hardly acid-soluble oxides; dissolving the oxidized alloy powders in a strong acid such as chloric acid, nitric acid, or sulfuric acid to leach rare earth metals by a strong acid leaching method; precipitating and filtering out oxides of iron and the like; adding acid such as oxalic acid to the resulting filtrate to precipitate rare earth-containing precipitate; and separating by filtration, drying, and calcining the obtained precipitate to give rare earth oxides.

Since the strong acid leaching method is applied to powdered alloys, this method is advantageous in that the amount of acid used in the process can be remarkably reduced, as compared to the above mentioned strong acid dissolving method. However, if the particle distribution of the alloy powders is not uniform, air oxidation does not proceed evenly, so that the eluting ratio of the rare earth elements upon leaching by a strong acid is decreased. Therefore, there has been no application of the strong acid leaching method to agglomerate alloy scrap. Particularly, in a powdering process of the agglomerate rare earth alloy, if the agglomerate alloy is pulverized in the atmosphere using an ordinary pulverizer such as a ball mill or a jet mill, it may ignite in the system and fire. Even if the agglomerate alloy is pulverized in a large scale air-tight system, it may explode upon taking it out. Thus, it is difficult to carry out this method in an industrial scale.

As described above, recovery of reusable rare earth compounds from rare earth alloy scrap in an industrial scale still has problems in view of economy and safety, so that the rare earth scrap is presently discarded. However, demand for the rare earth alloys for permanent magnets, nickel-hydrogen rechargeable batteries, and the like has been expanding with their recent increasing use in the field of electronics, and thus the amount of alloy scrap generated in the manufacturing process thereof is also expected to increase. Therefore, development of technique for recovering rare earth metals and the like contained in the alloy scrap is desired for making the most of resources.

SUMMARY OF THE INVENTION

It is therefore an object of the present invention to provide an effective and inexpensive method for recovering reusable rare earth compounds such as rare earth oxides, rare earth fluorides, or rare earth metals from rare earth alloy scrap including alloy wastes, defective products, and slug generated in the course of manufacturing products from rare earth alloys.

It is another object of the present invention to provide a method for recovering reusable rare earth compounds from rare earth alloy scrap with sufficient safety.

According to the present invention, there is provided a method for recovering a reusable rare earth compound comprising the steps of:

(a) pulverizing rare earth alloy scrap at least by hydrogenating said alloy scrap to obtain pulverized alloy scrap, (b) heating said pulverized alloy scrap to obtain an oxide, (c) contacting said oxide with an acid solution to leach rare earth element into the acid solution in the form of ions, and filtering a resulting solution containing rare earth ions to obtain a filtrate, and (d) forming a precipitate containing rare earth element from said filtrate.

PREFERRED EMBODIMENTS OF THE INVENTION

Figure 1:
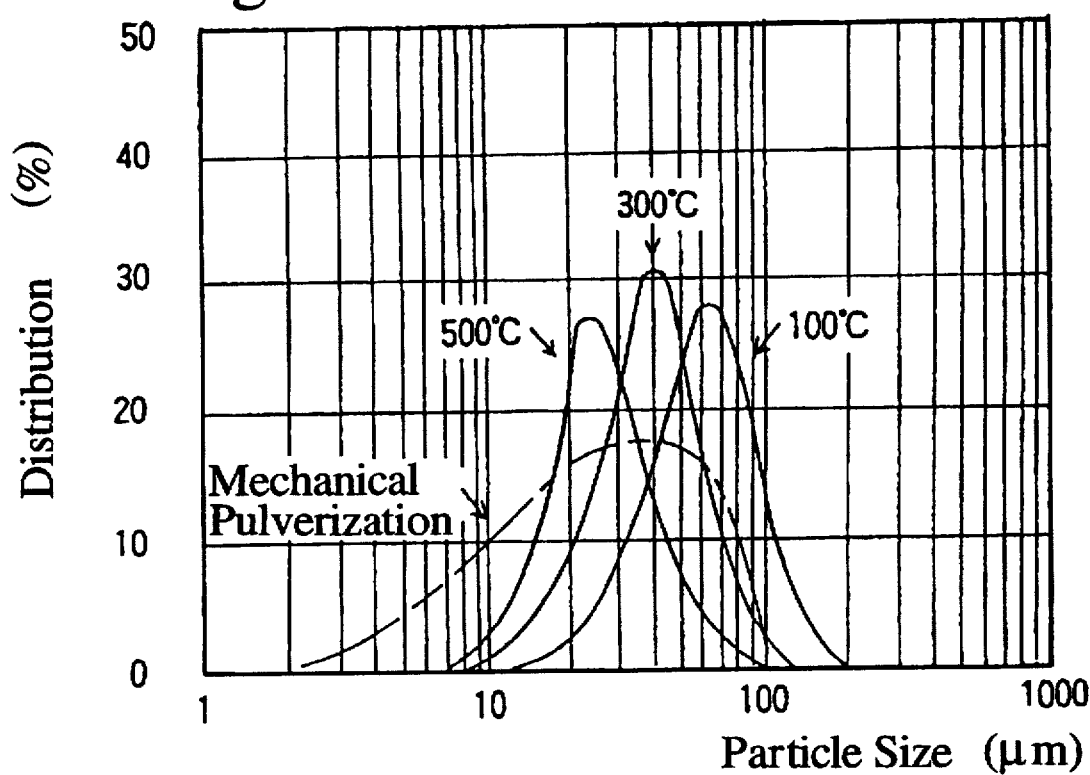
FIG. 1 is a graph showing a comparison of the particle distributions of alloy powders obtained by pulverizing neodymium-iron-boron magnet wastes by hydrogenation at 100° C., 300° C., and 500° C., respectively, in Examples 1 to 6, Examples 7 to 12, and Examples 13 to 18, respectively, with the particle distribution of alloy powders obtained by mechanically pulverizing the same magnet wastes.

The present invention will be explained in more detail hereinbelow.

In the present method for recovering a reusable rare earth compound, reusable rare earth compounds are recovered, such as rare earth metals including lanthanum, cerium, praseodymium, neodymium, samarium, gadolinium, dysprosium, erbium, and yttrium; rare earth oxides such as oxides of the aforementioned rare earth metals; or rare earth fluorides such as fluorides of the aforementioned rare earth metals.

The alloy scrap from which reusable rare earth compounds are recovered according to the present method is in the form of agglomerate and the like, and contains the above rare earth metals, and usually iron and/or nickel, and may optionally contain cobalt, boron, manganese, aluminum, or the like.

In the present method, first a step of (a) pulverizing rare earth alloy scrap at least by hydrogenating the alloy scrap to obtain pulverized alloy scrap is performed.

The pulverizing of the rare earth alloy scrap by hydrogenating the alloy scrap may be carried out, for example, by heating the alloy scrap in pressurized hydrogen atmosphere. Specifically, the step (a) may be carried out by charging the alloy scrap in a controlled atmosphere heating furnace such as a vacuum electric furnace; reducing the pressure in the furnace to no greater than $10^{-3}$ Torr, introducing hydrogen gas into the furnace to establish pressurized hydrogen atmosphere of 1 to 5 atm therein; and processing the alloy scrap at or higher than the ordinary temperature, preferably 100° to 800° C., more preferably 200° to 500° C. for 1 to 10 hours, preferably 3 to 5 hours to occlude hydrogen into the alloy scrap. By occluding hydrogen into the rare earth alloy scrap, the alloy scrap will expand rapidly by 20 to 25% by volume, so that fine cracks will occur in the rare earth alloy crystals, thereby uniformly pulverizing the alloy scrap. In order to occlude hydrogen into the alloy scrap at sufficient velocity for causing rapid volume expansion, hydrogen pressure of 1 atm or higher, and temperature of at or higher than the ordinary temperature are preferred in this step.

In step (a), dehydrogenation may be performed after the hydrogenation, or hydrogenation and dehydrogenation may be repeated, depending on the conditions such as the size of the alloy scrap. By controlling the number of hydrogenations and dehydrogenations performed, powders of suitable particle size may be obtained. For example, if the alloy scrap to be pulverized is large, hydrogenation and dehydrogenation may be repeated preferably for two to three times to obtain uniform powders of suitable particle size. It is preferred to terminate the repeated process by hydrogenation so that hydrogen resides in the resulting alloy powders. The average particle size of the pulverized alloy scrap obtained by step (a) is preferably 200 to 2000 μm.

In the present method, a step of (b) heating the pulverized alloy scrap to obtain an oxide is performed next.

The heating of the pulverized alloy scrap may be carried out by first cooling the pulverized alloy scrap obtained in step (a) in the controlled atmosphere heating furnace to 50° C. or lower, substituting the hydrogen gas in the furnace with inert gas such as argon or nitrogen, returning the pressure in the furnace to the ordinary pressure, transferring the pulverized alloy powders to a heating furnace such as an electric furnace in the atmosphere, and heating the pulverized alloy powders for air oxidation. The heating may preferably be carried out at 200° to 700° C., more preferably at 300° to 600° C., for 0.5 to 2 hours, more preferably for about 1 hour. In order to obtain oxides easily by heating the pulverized alloy scrap, the heating may preferably be carried out with hydrogen residing in the pulverized alloy scrap. When the heating is carried out in such condition, the hydrogen is combusted to generate steam of high activity, and rare earth metals contained in the pulverized alloy scrap are converted to highly acid-soluble oxides, while metals other than rare earth metals, such as iron and nickel contained in the pulverized alloy scrap are converted to hardly acid-soluble oxides. Accordingly, elution of the metals other than rare earth metals, such as iron and nickel contained in the pulverized alloy scrap can be minimized in the subsequent step (c). Further, in order to prevent hazardous generation of hydrogen in the subsequent step (c) due to the elution of the metals other than rare earth metals, the pulverized alloy scrap is heated preferably at 200° C. or higher temperature for sufficient oxidation thereof. On the other hand, in order to avoid consuming excess energy for leaching rare earth elements into an acid solution sufficiently in the subsequent step (c), the heating is carried out preferably at 700° C. or lower temperature.

In the present method, a step of (c) contacting the oxide obtained in step (b) with an acid solution to leach rare earth element in the form of ions into the acid solution, and filtering the resulting solution containing rare earth ions to obtain a filtrate is performed. The leaching of rare earth elements in the form of ions may be carried out by adding an acid solution such as chloric acid, nitric acid, or sulfuric acid to the oxides obtained above, thereby contacting the oxides to the acid solution. Specifically, this step may be carried out by introducing the oxides obtained in step (b) into a stirrer after cooling the oxides to 50° C. or lower, adding water to the oxides to prepare a slurry, and adding the acid solution such as nitric acid which has been preferably diluted to the concentration of 2 to 5N to the slurry, while stirring the slurry, to leach rare earth elements in the form of ions. In case the oxides to be contacted with the acid solution are agglomerated by heating, it is preferred, after cooling the oxides as mentioned above, to pulverize the agglomerated oxides by a disk mill or the like apparatus into 50 to 200 mesh, preferably 80 to 120 mesh before preparing the slurry. The acid solution may be added in an amount decided based on the calculated chemical equivalent to the amount of rare earth elements contained in the alloy scrap, under control in accordance with the leaching speed of the rare earth ions. Preferably, the acid solution is added under control so that the final pH of the slurry is not less than 3 in order to prevent elution of the metals other than rare earth elements. The filtering of the resulting solution containing rare earth ions to obtain a filtrate may be carried out by filtering out and removing the insoluble precipitate such as oxidized iron and/or nickel by a conventional method. The obtained filtrate, i.e. a solution containing rare earth ions may preferably contain only the rare earth ions of high purity, but may additionally contain iron and/or nickel which could not have been filtered out.

In the present method, a step of (d) forming a precipitate containing the rare earth elements from the filtrate obtained in step (c) is performed next.

The forming of a precipitate containing rare earth elements from the filtrate may be carried out by adding a precipitating agent such as oxalic acid, ammonium bicarbonate (ammonium hydrogencarbonate), sodium carbonate, hydrofluoric acid, or ammonium fluoride to the filtrate. In this step, the amount of the precipitating agent to be added to the filtrate is preferably 1.2 to 1.5 times as much as the chemical equivalent necessary to completely precipitate the rare earth ions contained in the filtrate. The formed precipitate may be recovered by a conventional filtering method. Metals other than rare earth metals, iron, and nickel, such as cobalt, boron, manganese, and aluminum contained in the alloy scrap, if any, can be separated and removed by this filtering process since these metals will remain in the filtrate from which the precipitate containing rare earth elements has been removed by filteration.

If a fluoride precipitating agent such as hydrofluoric acid, ammonium fluoride, or a mixture thereof is employed, rare earth fluorides can be formed as the precipitate. This precipitate may be recovered by filteration, preferably followed by drying at 500° to 900° C., preferably at 700° to 800° C. for obtaining the rare earth fluorides in the form of anhydrides. The recovered rare earth fluorides are reusable rare earth compounds, and can be used, for example, as the main ingredient of a molten salt bath used for ordinary molten salt electrolysis using a fluoride bath.

According to the present method, a step of (e) calcining the precipitate containing rare earth elements formed by adding a precipitating agent other than the fluoride precipitating agents, such as oxalic acid, ammonium bicarbonate, sodium carbonate, or a mixture thereof in said step (d) to produce rare earth oxides may subsequently be performed.

The above calcining may be carried out by separating the precipitate formed in step (d) by a conventional filtering method, preferably followed by drying and calcining at 800° to 1000° C. for 1 to 10 hours.

The rare earth oxides produced in above step (e) may contain metals other than rare earth elements, such as iron and nickel, and can be used as reusable rare earth compounds depending on the object and method of reuse. For example, these rare earth oxides are particularly suitable for reuse as a raw material for producing rare earth metals by molten salt electrolysis using a fluoride bath. In this case, in order to perform the molten salt electrolysis with excellent electric current efficiency, it is preferred that the content of the metals such as iron and nickel is less than 10 weight %, more preferably less than 5 weight %. Further, it is preferred to recover, in the form of rare earth oxides, 80 to 98 weight % of the rare earth metals contained in the raw alloy scrap.

According to the present method, a step of (f) refining the rare earth oxides recovered in step (e) to produce rare earth metals may subsequently be performed.

The refining of the rare earth oxides may be carried out by a conventional method such as molten salt electrolysis using a fluoride bath. Specifically, this step may be carried out by molten salt electrolysis including the steps of introducing the produced rare earth oxides into a bath containing mixed salts including 25 to 35 weight % of lithium fluoride, 10 to 25 weight % of barium fluoride, and 40 to 65 weight % of neodymium fluoride, and electrolyzing while melting the introduced rare earth oxides usually at 750° to 1000° C., preferably 800° to 950° C. The rare earth fluorides recovered in step (d) may be used in the mixed salt bath in this process.

Through this refining step, rare earth metals can ultimately be recovered from the raw alloy scrap.

The rare earth metals recovered in step (f) may contain metals other than rare earth elements, such as iron and nickel, and can be used as reusable rare earth compounds depending on the object and method of reuse. In this case, it is preferred to recover 80 to 95 weight % of the rare earth metals contained in the raw ally scrap.

According to the present method for recovering a reusable rare earth compound, rare earth alloy scrap which has hitherto been disposed as industrial wastes can be pulverized easily without any risk of ignition, and the rare earth compound can be recovered in a safe manner in the form of rare earth oxides, rare earth fluorides, or rare earth metals. Further, since elution of metals other than rare earth elements, such as iron and nickel into the acid solution can be minimized, the amount of acid required for the process can be remarkably reduced as compared to the conventional strong acid dissolving method, thus being economically advantageous. Further, reusable rare earth compounds such as rare earth oxides, rare earth fluorides, or rare earth metals exhibiting sufficiently high performance can be recovered in an industrially effective manner.

EXAMPLES

The present invention will be explained by Examples and Comparative Examples, but the invention is not limited thereto.

Examples 1 to 6

300 g of neodymium-iron-boron magnet wastes containing about 25 weight % of rare earth metals and about 73 weight % of iron were charged in a vacuum heating vessel. The vessel was evacuated and then charged with hydrogen gas to establish pressurized hydrogen atmosphere of 3 atoms therein. The magnet wastes were then heated at 100° C. for 2 hours to occlude hydrogen into the magnet wastes until they were saturated with hydrogen, thereby pulverizing the magnet wastes by hydrogenation.

The obtained alloy powders were cooled down to the ordinary temperature, and taken out of the vessel after the hydrogen gas in the vessel was substituted by argon gas while the temperature of the vessel was returned to the ordinary temperature. The particle distribution of the obtained alloy powders was measured by MICROTRAC PARTICLE-SIZE ANALYZER (trade name) manufactured by Leeds & Northrup Co.. The results are shown in FIG. 1.

Samples of 30 g each of the alloy powders were charged separately in six porcelain boats, respectively, and heated for 1 hour at 200° C. (Example 1), 300° C. (Example 2), 400° C. (Example 3), 500° C. (Example 4), 600° C. (Example 5), and 700° C. (Example 6), respectively, in an open type nichrome heating electric furnace to air-oxidize the alloy powders. Each sample was cooled down to the ordinary temperature, pulverized in a mortar into a particle size of 100 mesh, transferred into a beaker with stirrer, and mixed with 100 ml of water to give a slurry.

63 ml of 3N nitric acid were added dropwise over 1 hour to each slurry while the pH of the slurry was controlled not to become less than 3. The slurry was further agitated for 1 hour, and the precipitate containing iron oxide formed in the slurry was filtered out to obtain a solution containing rare earth ions.

To the thus obtained solution, 47 ml of 2N oxalic acid solution were added to precipitate the rare earth ions as oxalates, and the precipitate was separated by filteration and calcined at 1000° C. for 1 hour to give rare earth oxides.

The obtained rare earth oxides were weighed, and the amount of rare earth elements contained in the rare earth oxides was analyzed by a chemical analysis method according to JIS M8404. Recovery ratio of rare earth metals was calculated from the obtained values and the amount of rare earth metals contained in the initial magnet wastes. The results are shown in Table 1.

Further, in order to determine the ratio of iron eluted in the leaching process with a strong acid, to the filtrate obtained by filtering out the oxalates were added 96 ml of 2N sodium hydroxide to precipitate iron ions contained in the filtrate as iron hydroxide. The resulting precipitate was separated by filtration and calcined to give iron oxide. The elution ratio of iron was calculated from the amount of the obtained iron oxide and the amount of iron contained in the initial magnet wastes. The results are shown in Table 1.

Comparative Example 1

30 g of the magnet wastes as employed in Examples 1 to 6 were directly charged in a porcelain boat without pulverizing the magnet wastes by hydrogenation, and heated at 600° C. for 2 hours in an open type nichrome heating electric furnace to air-oxidize the sample.

The sample was cooled down to the ordinary temperature, and pulverized in a mortar into smaller than 100 mesh, and rare earth oxides and iron oxide were obtained in the same way as in Examples 1 to 6.

The weight of the rare earth oxides, the amount of rare earth elements contained in the rare earth oxides, and the amount of the iron oxide were measured in the same way as in Examples 1 to 6 to calculate the recovery ratio of the rare earth metals and the elution ratio of the iron. The results are shown in Table 1.

TABLE 1

|  | Heating Temp. in Pulverization by Hydrogenation (°C.) | Heating Temp. in Oxidation (°C.) | Amount of Rare Earth Oxides Obtained (g) | Recovery Ratio of Rare Earth Metals (%) | Amount of Iron Oxide Obtained (g) | Elution Ratio of Iron (%) |
|---|---|---|---|---|---|---|
| Example 1 | 100 | 200 | 7.83 | 89 | 4.38 | 14 |
| Example 2 |  | 300 | 7.39 | 84 | 3.76 | 12 |
| Example 3 |  | 400 | 7.04 | 80 | 1.97 | 6.2 |
| Example 4 |  | 500 | 6.69 | 76 | 1.03 | 3.3 |
| Example 5 |  | 600 | 6.16 | 70 | 0.78 | 2.5 |
| Example 6 |  | 700 | 5.54 | 63 | 0.63 | 2.0 |
| Example 7 | 300 | 200 | 8.36 | 95 | 3.13 | 10 |
| Example 8 |  | 300 | 8.10 | 92 | 1.97 | 6.3 |
| Example 9 |  | 400 | 7.74 | 88 | 0.78 | 2.5 |
| Example 10 |  | 500 | 7.30 | 83 | 0.53 | 1.7 |
| Example 11 |  | 600 | 7.04 | 80 | 0.40 | 1.3 |
| Example 12 |  | 700 | 6.16 | 70 | 0.31 | 1.0 |
| Example 13 | 500 | 200 | 8.10 | 92 | 3.13 | 10 |
| Example 14 |  | 300 | 7.83 | 89 | 2.19 | 7.0 |
| Example 15 |  | 400 | 7.39 | 84 | 1.03 | 3.3 |
| Example 16 |  | 500 | 7.04 | 80 | 0.78 | 2.5 |
| Example 17 |  | 600 | 6.69 | 76 | 0.53 | 1.7 |
| Example 18 |  | 700 | 6.16 | 70 | 0.47 | 1.5 |
| Comp. Ex. 1 | — | 600 | 4.66 | 53 | 5.95 | 19 |

Examples 7 to 12

Rare earth oxides and iron oxide were recovered in the same way as in Examples 1 to 6 except that the heating temperature for hydrogenation was set to 300° C.

The weight of the rare earth oxides, the amount of rare earth elements contained in the rare earth oxides, and the amount of the iron oxide were measured in the same way as in Examples 1 to 6 to calculate the recovery ratio of the rare earth metals and the elution ratio of the iron. The results are shown in Table 1.

Examples 13 to 18

Rare earth oxides and iron oxide were recovered in the same way as in Examples 1 to 6 except that the heating temperature for hydrogenation was set to 500° C.

The weight of the rare earth oxides, the amount of rare earth elements contained in the rare earth oxides, and the amount of the iron oxide were measured in the same way as in Examples 1 to 6 to calculate the recovery ratio of the rare earth metals and the elution ratio of the iron. The results are shown in Table 1.

Example 19

300 g of neodymium-iron-boron magnet wastes containing about 25 weight % of rare earth metals and about 73 weight % of iron were charged in a vacuum heating vessel. The vessel was evacuated and then charged with hydrogen gas to establish pressurized hydrogen atmosphere of 3 atoms therein. The magnet wastes were then heated at 300° C. for 2 hours to occlude hydrogen into the wastes until they were saturated with hydrogen, thereby pulverizing the magnet wastes by hydrogenation.

The obtained alloy powders were cooled down to the ordinary temperature, and taken out of the vessel after the hydrogen gas in the vessel was substituted by argon gas while the temperature of the vessel was returned to the ordinary temperature.

30 g of this alloy powders were charged in a porcelain boat, and heated at 500° C. for 1 hour in an open type nichrome heating electric furnace to air-oxidize the alloy powders. The sample was cooled down to the ordinary temperature, pulverized in a mortar into a particle size of 100 mesh, transferred into a beaker with stirrer, and mixed with 100 ml of water to give a slurry.

63 ml of 3N nitric acid were added dropwise over 1 hour to the slurry while the pH of the slurry was controlled not to become less than 3. The slurry was further agitated for 1 hour, and the precipitate containing iron oxide formed in the slurry was filtered out to obtain a solution containing rare earth ions.

To the thus obtained solution, 117 ml of 2N hydrofluoric acid solution were added to form fluorides, and subsequently the pH of the solution was adjusted to 3 by adding aqueous ammonia, followed by stirring and aging for 1 hour, thereby precipitating rare earth fluorides. The resulting precipitate was separated by filtration and dried at 700° C. for 1 hour, thereby obtaining 9.32 g of rare earth fluorides.

The amount of rare earth elements contained in the rare earth fluorides was analyzed by a chemical analysis method according to JIS M8404, and recovery ratio of the rare earth metals was calculated from the obtained value and the amount of rare earth metals contained in the initial magnet wastes. The recovery ratio of the rare earth metals was found to be 89%. Further, analysis of iron contained in the rare earth fluorides as impurities was carried out to find that the ratio of iron contained in the rare earth fluorides was 0.15%.

On the other hand, in order to determine the ratio of iron eluted in the leaching process with a strong acid, to the filtrate obtained by filtering out the rare earth fluorides were added 96 ml of 2N sodium hydroxide to precipitate iron ions contained in the filtrate as iron hydroxide. The resulting precipitate was separated by filtration and calcined to give iron oxide. The elution ratio of iron was calculated from the amount of the obtained iron oxide and the amount of iron contained in the initial magnet wastes to find that the elution ratio of iron was 1.7%.

Examples 20 to 25

Figure 2:
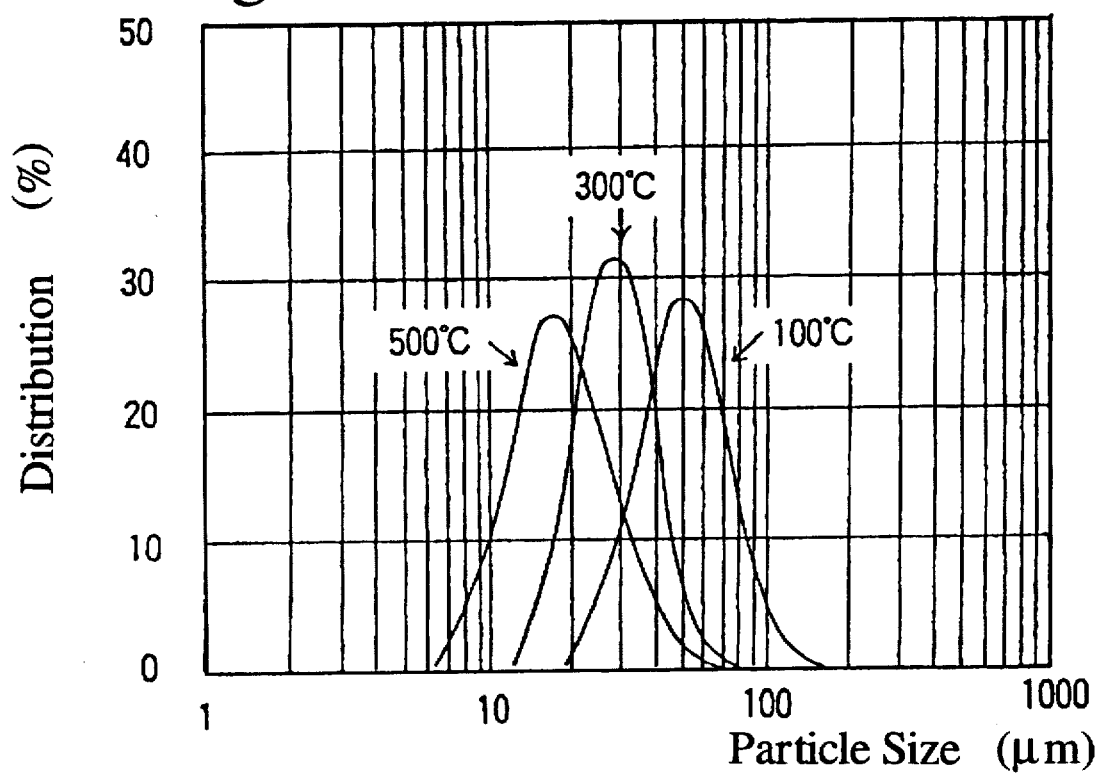
FIG. 2 is a graph showing the particle distribution of alloy powders obtained by pulverizing misch metal-nickel hydrogen storage alloy slug by hydrogenation at 100° C., 300° C., and 500° C., respectively, in Examples 20 to 25, Examples 26 to 31, and Examples 32 to 37, respectively.

300 g of misch metal-nickel hydrogen storage alloy slug containing 28.9 weight % of misch metal and 65.2 weight % of nickel were pulverized by hydrogenation in the same way as in Examples 1 to 6. The particle distribution of the obtained alloy powders was measured by MICROTRAC PARTICLE-SIZE ANALYZER (trade name) manufactured by Leeds & Northrup Co.. The results are shown in FIG. 2.

Samples of 30 g each of the alloy powders were charged separately in six porcelain boats, respectively, and processed in the same way as in Examples 1 to 6 to obtain rare earth oxides.

The weight of the rare earth oxides and the amount of rare earth elements contained in the rare earth oxides were measured in the same way as in Examples 1 to 6 to calculate the recovery ratio of the rare earth metals. The results are shown in Table 2.

Further, in order to determine the ratio of nickel eluted in the leaching process with a strong acid, to the filtrate obtained by filtering out the oxalate were added 60 ml of 2N sodium hydroxide to precipitate nickel ions contained in the filtrate as nickel hydroxide. The resulting precipitate was separated by filtration and calcined to give nickel oxide. The elution ratio of nickel was calculated from the amount of the obtained nickel oxide and the amount of nickel contained in the initial slug. The results are shown in Table 2.

Examples 26 to 31

Rare earth oxides and nickel oxide were recovered in the same way as in Examples 20 to 25 except that the heating temperature for hydrogenation was set to 300° C.

The weight of the rare earth oxides, the amount of rare earth elements contained in the rare earth oxides, and the amount of the nickel oxide were measured in the same way as in Examples 20 to 25 to calculate the recovery ratio of the rare earth metals and the elution ratio of the nickel. The results are shown in Table 2.

Example 32 to 37

Rare earth oxides and nickel oxide were recovered in the same way as in Examples 20 to 25 except that the heating temperature for hydrogenation was set to 500° C.

The weight of the rare earth oxides, the amount of rare earth elements contained in the rare earth oxides, and the amount of the nickel oxide were measured in the same way as in Examples 20 to 25 to calculate the recovery ratio of the rare earth metals and the elution ratio of the nickel. The results are shown in Table 2.

Comparative Example 2

30 g of the misch metal-nickel hydrogen storage alloy slug as employed in Examples 20 to 25 were directly charged in a porcelain boat without pulverizing the slug by hydrogenation, and heated at 600° C. for 2 hours in an open type nichrome heating electric furnace to air-oxidize the sample.

The samples was cooled down to the ordinary temperature, and pulverized in a mortar to smaller than 100 mesh, and rare earth oxides and nickel oxide were obtained in the same way as in Examples 20 to 25. The weight of the rare earth oxides, the amount of rare earth elements contained in the rare earth oxides, and the amount of the nickel oxide were measured in the same way as in Examples 20 to 25 to calculate the recovery ratio of the rare earth metals and the elution ratio of the nickel. The results are shown in Table 2.

TABLE 2

| | Heating Temp. in Pulverization by Hydrogenation (°C.) | Heating Temp. in Oxidation (°C.) | Amount of Rare Earth Oxides Obtained (g) | Recovery Ratio of Rare Earth Metals (%) | Amount of Iron Oxide Obtained (g) | Elution Ratio of Iron (%) |
|---|---|---|---|---|---|---|
| Example 20 | 100 | 200 | 9.36 | 90 | 4.47 | 18 |
| Example 21 | | 300 | 9.05 | 87 | 3.97 | 16 |
| Example 22 | | 400 | 8.74 | 84 | 2.73 | 11 |
| Example 23 | | 500 | 8.32 | 80 | 1.24 | 5 |
| Example 24 | | 600 | 7.80 | 75 | 0.92 | 3.7 |
| Example 25 | | 700 | 7.07 | 68 | 0.82 | 3.3 |
| Example 26 | 300 | 200 | 9.98 | 96 | 3.48 | 14 |
| Example 27 | | 300 | 9.67 | 93 | 2.24 | 9.0 |

TABLE 2-continued

|  | Heating Temp. in Pulverization by Hydrogenation (°C.) | Heating Temp. in Oxidation (°C.) | Amount of Rare Earth Oxides Obtained (g) | Recovery Ratio of Rare Earth Metals (%) | Amount of Iron Oxide Obtained (g) | Elution Ratio of Iron (%) |
| --- | --- | --- | --- | --- | --- | --- |
| Example 28 |  | 400 | 9.15 | 88 | 1.07 | 4.3 |
| Example 29 |  | 500 | 8.74 | 84 | 0.67 | 2.7 |
| Example 30 |  | 600 | 8.00 | 77 | 0.50 | 2.0 |
| Example 31 |  | 700 | 7.49 | 72 | 0.42 | 1.7 |
| Example 32 | 500 | 200 | 9.46 | 91 | 3.73 | 15 |
| Example 33 |  | 300 | 9.26 | 89 | 2.48 | 10 |
| Example 34 |  | 400 | 8.84 | 85 | 1.49 | 6.0 |
| Example 35 |  | 500 | 8.53 | 82 | 1.14 | 4.6 |
| Example 36 |  | 600 | 7.90 | 76 | 0.82 | 3.3 |
| Example 37 |  | 700 | 7.18 | 69 | 0.67 | 2.7 |
| Comp. Ex. 2 | — | 600 | 5.72 | 55 | 2.81 | 11.3 |

Example 38

10 kg of neodymium-iron-boron magnet wastes containing about 25 weight % of rare earth metals and about 73 weight % of iron were charged in a vacuum heating vessel. The vessel was evacuated and then charged with hydrogen gas to establish pressurized hydrogen atmosphere of 3 atoms therein. The magnet wastes were then heated at 300° C. for 2 hours to occlude hydrogen into the magnet wastes until they were saturated with hydrogen, thereby pulverizing the magnet wastes by hydrogenation.

The obtained alloy powders were cooled down to the ordinary temperature, and taken out of the vessel after the hydrogen gas in the vessel was substituted by argon gas while the temperature of the vessel was returned to the ordinary temperature.

The obtained alloy powders were heated at 300° C. for 2 hours in an open type nichrome heating electric furnace to air-oxidize the alloy powders. The sample was cooled down to the ordinary temperature, pulverized by a disk mill into a particle size of 100 mesh, transferred into a stirring tank, and mixed with 30 liters of water to give a slurry.

17.9 liters of 3N nitric acid were added dropwise over 5 hours to the slurry while the pH of the slurry was controlled not to become less than 3. The slurry was further agitated for 2 hours, and the precipitate containing iron oxide formed in the slurry was filtered out to obtain a solution containing rare earth ions.

To the thus obtained solution, 14.3 liters of 2N oxalic acid were added to precipitate the rare earth ions as oxalate, and the precipitate was separated by filteration and calcined at 800° C. for 5 hours to give 2.68 kg of rare earth oxides.

Then the rare earth oxides were introduced into an electrolytic molten salt bath consisting of 30 weight % of lithium fluoride, 20 weight % of barium fluoride, and 50 weight % of neodymium fluoride while electrolyzing at 900° C. to obtain 2.4 kg of rare earth-iron master alloy. The rare earth-iron master alloy contained 2.0 kg of rare earth metals, and the recovery ratio of the rare earth metals based on the amount of the rare earth metals contained in the initial magnet wastes was 82%. The results are shown in Table 3.

Comparative Example 3

10 kg of the magnet wastes as employed in Example 38 were subjected to pulverization in a jaw crusher and a jet mill, but the magnet wastes ignited upon introducing into the jaw crusher, and could not be pulverized. Thus, the magnet wastes were directly charged into a porcelain vessel and heated at 600° C. for 2 hours in an open type nichrome heating electric furnace to air-oxidize the magnet wastes. The oxidized magnet wastes were processed in the same way as in Example 38 to obtain 1.49 kg of rare earth oxides.

Then the rare earth oxides were processed in the same way as in Example 38 to obtain 1.34 kg of rare earth-iron master alloy. The rare earth-iron master alloy contained 1.14 kg of rare earth metals, and the recovery ratio of the rare earth metals based on the amount of the rare earth metals contained in the initial magnet wastes was 45.7%. The results are shown in Table 3.

TABLE 3

|  | Heating Temp. in Pulverization by Hydrogenation (°C.) | Heating Temp. in Oxidation (°C.) | Amount of Rare Earth Oxides Obtained (kg) | Amount of Rare Earth-Iron Master Alloy Obtained (kg) | Amount of Rare Earth Metals in Rare Earth-Iron Master Alloy (kg) | Recovery Ratio of Rare Earth Metals (%) |
| --- | --- | --- | --- | --- | --- | --- |
| Example 38 | 300 | 300 | 2.68 | 2.4 | 2.0 | 82 |
| Comp. Ex. 3 | — | 600 | 1.49 | 1.34 | 1.14 | 45.7 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for recovering a reusable rare earth compound comprising the steps of:

(a) pulverizing rare earth alloy scrap by a method comprising hydrogenation of said alloy scrap to obtain pulverized alloy scrap containing hydrogen, (b) oxidizing said pulverized alloy scrap under heating to obtain an oxide, (c) contacting said oxide with a controlled amount of an acid solution thereby leaching rare earth elements into the acid solution in the form of ions to form a resulting solution having pH of not less than 3, and filtering the resulting solution to obtain a filtrate, and (d) forming a precipitate containing rare earth elements from said filtrate.

2. The method as claimed in claim 1 wherein said hydrogenating is carried out at or higher than ordinary temperature under a pressurized hydrogen atmosphere of 1 to 5 atm.

3. The method as claimed in claim 1 wherein said pulverized alloy scrap has an average particle size of 200 to 2000 μm.

4. The method as claimed in claim 1 wherein said heating in said step (b) is carried out at 200° to 700° C.

5. The method as claimed in claim 1 wherein said acid solution is selected from the group consisting of chloric acid, nitric acid, sulfuric acid, and mixtures thereof having a concentration of 2 to 5N.

6. The method as claimed in claim 1 wherein said oxide is slurried for contacting with said acid solution in step (c).

7. The method as claimed in claim 1 wherein said step (d) of forming a precipitate containing rare earth element is carried out by adding a precipitating agent selected from the group consisting of oxalic acid, ammonium bicarbonate, sodium carbonate, and mixtures thereof to the filtrate.

8. The method as claimed in claim 7 further comprising the step of (e) calcining said precipitate formed in said step (d) to produce a rare earth oxide.

9. The method as claimed in claim 8 wherein said calcining in step (e) is carried out at 800° to 1000° C.

10. The method as claimed in claim 8 further comprising the step of (f) refining said rare earth oxide to produce a rare earth metal.

11. The method of claim 10 wherein said refining in step (f) further comprises the steps of introducing the rare earth oxide into a mixed salt bath containing 25 to 35 weight % of lithium fluoride, 10 to 25 weight % of barium fluoride, and 40 to 65 weight % of rare earth fluoride, and electrolyzing while melting the rare earth oxide at 750° to 1000° C.

12. The method as claimed in claim 1 wherein said forming of a precipitate containing rare earth element in said step (d) is carried out by adding a fluoride precipitating agent selected from the group consisting of hydrofluoric acid, ammonium fluoride, and mixtures thereof to the filtrate to generate a rare earth fluoride.

13. The method as claimed in claim 12 wherein said rare earth fluoride is dried at 500° to 900° C. to generate an anhydride thereof.

* * * * *